US010025321B2

(12) United States Patent
Inderrieden et al.

(10) Patent No.: US 10,025,321 B2
(45) Date of Patent: Jul. 17, 2018

(54) SELF-SERVICE SYSTEM WITH USER INTERFACE POSITIONING

(75) Inventors: Michael Thomas Inderrieden, Lawrenceville, GA (US); Greg Scott Egan, Flowery Branch, GA (US)

(73) Assignee: NCR Corporation, Atlanta, GA (US)

( * ) Notice: Subject to any disclaimer, the term of this patent is extended or adjusted under 35 U.S.C. 154(b) by 716 days.

(21) Appl. No.: 12/697,469

(22) Filed: Feb. 1, 2010

(65) Prior Publication Data

US 2011/0153115 A1 Jun. 23, 2011

Related U.S. Application Data

(60) Provisional application No. 61/288,395, filed on Dec. 21, 2009.

(51) Int. Cl.
*G09G 5/00* (2006.01)
*G05D 3/10* (2006.01)
*G07F 19/00* (2006.01)

(52) U.S. Cl.
CPC ............ *G05D 3/10* (2013.01); *G07F 19/205* (2013.01)

(58) Field of Classification Search
CPC ................................. G05D 1/02; G06F 3/041
USPC .......................................... 345/156; 700/302
See application file for complete search history.

(56) References Cited

U.S. PATENT DOCUMENTS

| 5,644,119 | A | * | 7/1997 | Padula et al. ................. 235/384 |
|---|---|---|---|---|
| 6,414,672 | B2 | * | 7/2002 | Rekimoto et al. ............ 345/173 |
| 6,538,622 | B1 | * | 3/2003 | Kojima et al. .................... 345/7 |
| 6,587,758 | B2 | * | 7/2003 | Obradovich et al. ............. 701/1 |
| 7,035,822 | B1 | * | 4/2006 | Kit .................................... 705/39 |
| 7,644,039 | B1 | * | 1/2010 | Magee et al. .................... 705/43 |
| 2004/0158499 | A1 | * | 8/2004 | Dev et al. ........................ 705/26 |
| 2004/0249497 | A1 | * | 12/2004 | Saigh et al. ................... 700/216 |
| 2006/0122896 | A1 | * | 6/2006 | Parsley ................... G06Q 30/02 705/26.1 |
| 2009/0265644 | A1 | * | 10/2009 | Tweed et al. ................... 715/762 |
| 2010/0057612 | A1 | * | 3/2010 | Wagenhals ....................... 705/40 |
| 2010/0188342 | A1 | * | 7/2010 | Dunn .................. G06F 3/04886 345/173 |

\* cited by examiner

*Primary Examiner* — Towfiq Elahi
(74) *Attorney, Agent, or Firm* — Schwegman, Lundberg & Woessner

(57) ABSTRACT

A self-service system with user interface positioning which accommodates drive-through vehicles of different heights and optionally different distances from an order board. The self-service system includes a user interface and a computer for positioning the user interface at a height above ground which substantially coincides with a window height above the ground of a vehicle adjacent the user interface. The height of the user interface is within a predetermined range of possible heights of the user interface corresponding to different window heights of different vehicles.

13 Claims, 5 Drawing Sheets

SELF-SERVICE SYSTEM WITH USER INTERFACE POSITIONING

CROSS-REFERENCE TO RELATED APPLICATION

The present application claims the benefit of the filing date of Provisional Application Ser. No. 61/288,395, filed Dec. 21, 2009.

BACKGROUND

Self-service computers have proven useful in many industries, such as retail, airline, hotel, healthcare and financial industries.

With the exception of conducting a financial transaction via a drive-through automated teller machine (ATM), most self-service solutions have the user walking up to a self-service computer in order to use it. One reason that more drive-through or in-vehicle self-service solutions have not been deployed is the difficulty with locating a touch screen device to accommodate the various vehicle, e.g., car and truck, models and the various physical dimensions of the users in those various car and truck models.

Drive-through ATMs include a keypad and a separately located small display, commonly ten inches, which makes accommodating a large range of vehicles and users easier. Touch screen applications involved in fast-food ordering, airline check-in, and hotel check-in, for example, are more complicated. They require more screen touches to complete and require more screen size. Therefore, these solutions due not easily lend themselves to drive-through operation.

Therefore, it would be desirable to provide a self-service system with user interface positioning.

SUMMARY

A self-service system with touch screen positioning is provided.

The self-service system includes a user interface and a computer for positioning the user interface at a height above ground which substantially coincides with a window height above the ground of a vehicle adjacent the user interface. The height of the user interface is within a predetermined range of possible heights of the user interface corresponding to different window heights of different vehicles.

DETAILED DESCRIPTION

Figure 1:
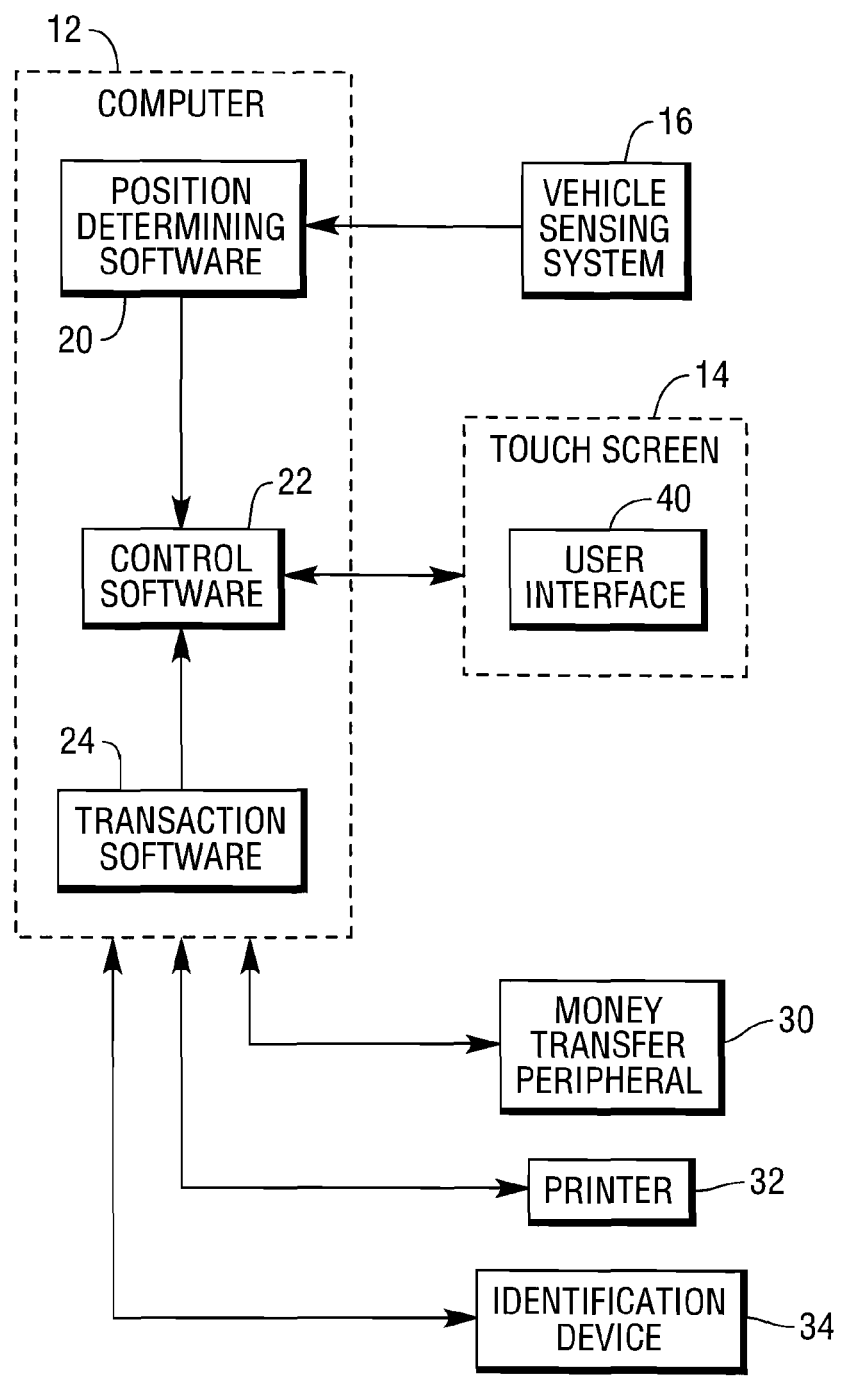
FIG. 1 illustrates a block diagram of a first example self-service system.

Referring now to FIG. 1, an example self-service system includes computer 12, touch screen 14, and sensing system 16.

Computer 12 executes control software 22 which controls positioning of a user interface 40. An example user interface 40 includes displayed screens from transaction software 24 and corresponding active touch points of touch screen 14. Alternative examples of user interface 40 may include a display and a separate input device, such as a keyboard and/or a mouse. Other peripherals and combinations of peripherals are envisioned.

Control software 22 may automatically position user interface 40 or position user interface 40 under customer/operator control. In an automatic mode, control software 22 provides user interface 40 at an optimal location based upon the reference point determined by position determining software 20 from a captured image. In a manual mode, a customer touches a predetermined area of the touch screen 14 having controls for moving user interface 40 or may control user interface 40 through a separately provided customer control.

Position determining software 20 receives and processes information from sensing system 16. For example, sensing system 16 may include a camera, such as a charge coupled device camera, for capturing images of vehicles adjacent to system 10. Position determining software 20 controls operation of the camera and analyzes images captured by the camera. Position determining software 20 further maps a subset of points in the images to corresponding points for use by control software 22.

Position determining software 20 may additionally determine from the images that a vehicle is present or not present as a precursor to determining the location of the reference point. Alternatively, sensing system 16 may include more than one sensor for capturing information about a vehicle adjacent to system 10. For example, an additional sensor may include an in-ground or other vehicle presence sensor for sensing when a vehicle is positioned adjacent to system 10.

During a drive-through transaction, position determining software 20 determines a location of one or more predetermined reference points of a vehicle adjacent to vehicle sensing system 16. Example reference points may include driver-side mirror location, bottom or middle point of the driver-side window, or any other point of the vehicle within the range of sensing system 16. If sensing system 16 includes a camera, the reference points may include any point that is likely to be within the camera's field of view, such as points on or around the driver-side window.

In a first example embodiment, control software 22 positions user interface 40 while touch screen 14 remains stationary. Control software 22 may further increase or decrease the size of user interface 40 to an optimal size based upon window size. Control software 22 displays transaction screens with greater or less size, and increases or decreases the size of corresponding touch areas, including increasing or decreasing the number of touch points. For example, control software 22 may size user interface 40 to the approximate dimensions of driver-side window.

Control software 22 may display advertising and promotions in areas of touch screen 14 that are not occupied by user interface 40.

Figure 2:
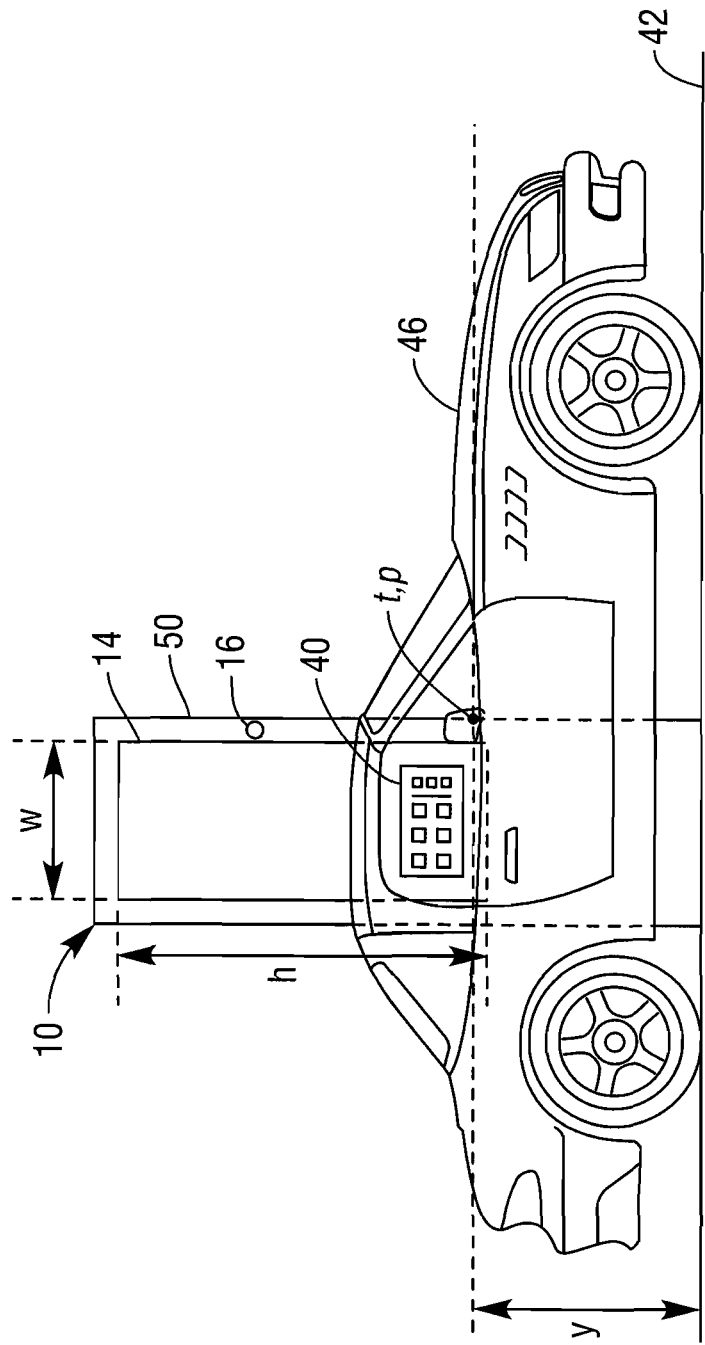
FIG. 2 illustrates a first example operating position of a user interface according to the first example self-service system.

With reference to FIG. 2, position determining software 20 receives a captured image of a low-profile sports car 46 from vehicle sensing system 16 and identifies reference point p in the image that corresponds to the driver-side mirror. Control software 22 obtains a corresponding touch screen point t from a mapping of touch screen points to captured image points and positions user interface 40 at an optimal position relative to touch screen point t. Control software 22 may position user interface 40 at touch screen point t, or at a predetermined horizontal and/or vertical distance from touch screen point t as shown.

Figure 3:
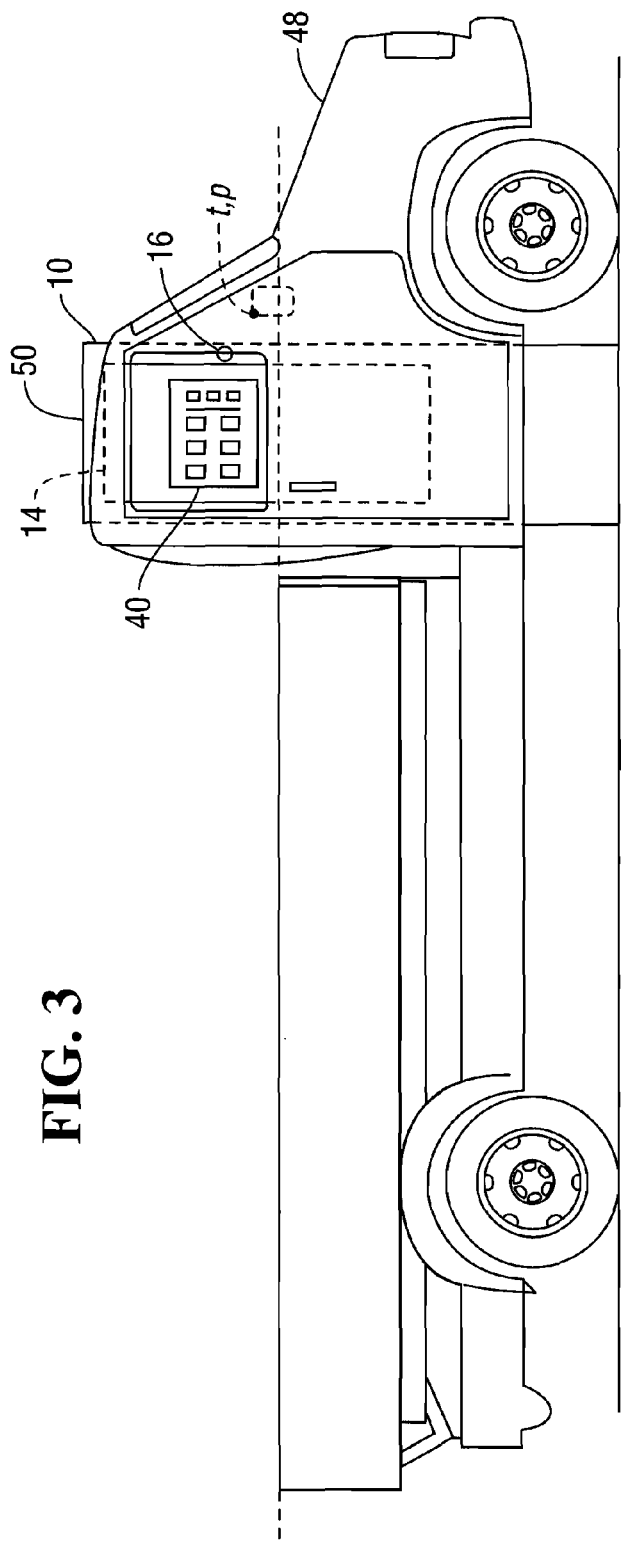
FIG. 3 illustrates a second example operating position of a user interface according to the first example self-service system.

With reference to FIG. 3, position determining software 20 receives a captured image of a truck 48 from vehicle sensing system 16 and identifies reference point p in the image that corresponds to the driver-side mirror. Control software 22 obtains a corresponding touch screen point t from the mapping of touch screen points to captured image points and positions user interface 40 at an optimal position relative to touch screen point t. Control software 22 may additionally increase the size of user interface 40 to accommodate the larger window of truck 48, as shown.

Touch screen 14 has dimensions which are sufficiently large enough to provide a range of positions for locating user interface 40. Since vehicles 42 come in various heights above ground or drive-through lane level, of primary concern are touch screen height, h, from a bottom end to a top end, and mounting height, y, on order station housing 50 measured between the bottom end to drive through lane 44. However, touch screen 14 may also have a width sufficiently large enough to accommodate variations in horizontal positions of vehicles 42 and to facilitate sizing of user interface 40 along both height and width dimensions h and w to approximate driver-side window sizes.

The bottom-to-top height h of touch screen 14, the mounting height y of the bottom end above drive-through lane level, and the positioning of user interface 40 anywhere within touch screen 14 may be based upon driver-side windows of all vehicles or a subset of vehicles. For example, touch screen 14 may be large enough to accommodate the low-profile sports car of FIG. 2, the full-size truck of FIG. 3, and everything in between, but not vehicles outside this range.

Returning to FIG. 1, computer 12 further executes transaction software 24 for completing a drive-through transaction. Transaction software 24 displays transaction screens and processes user selections, including items for purchase.

The functions of computer 12 may be performed by one or more computers and combinations of computers. For example, some of the functions of computer 12 may be performed by a server computer coupled to computer 12 via a network.

Computer 12 includes a processor, memory, and may execute an operating system such as a Microsoft operating system, which can display screen information within one or more windows.

Movement of user interface 40 according to the first embodiment is particularly useful in completing cash transactions, such as those at fast food restaurants. In those venues, drive-through customers typically select items for purchase and pay with money currency and/or coins.

In other venues, system 10 may include additional peripherals necessary to accomplish its purpose. In the first example embodiment, the additional peripherals may be located at an optimal compromise height on order station housing 50, between the bottom and top ends of touch screen 14.

The additional peripherals may include one or more money transfer peripherals 30, one or more printers 32, and one or more identification devices 34.

An example money transfer peripheral 30 may include a card reader for reading debit and credit cards, a currency and/or coin accepter, and/or a currency and/or coin dispenser. The card reader may also function to read patron loyalty cards.

An example printer may include a receipt printer.

An example identification device 34 may include a barcode reader and/or radio frequency identification (RFID) reader.

Figure 4:
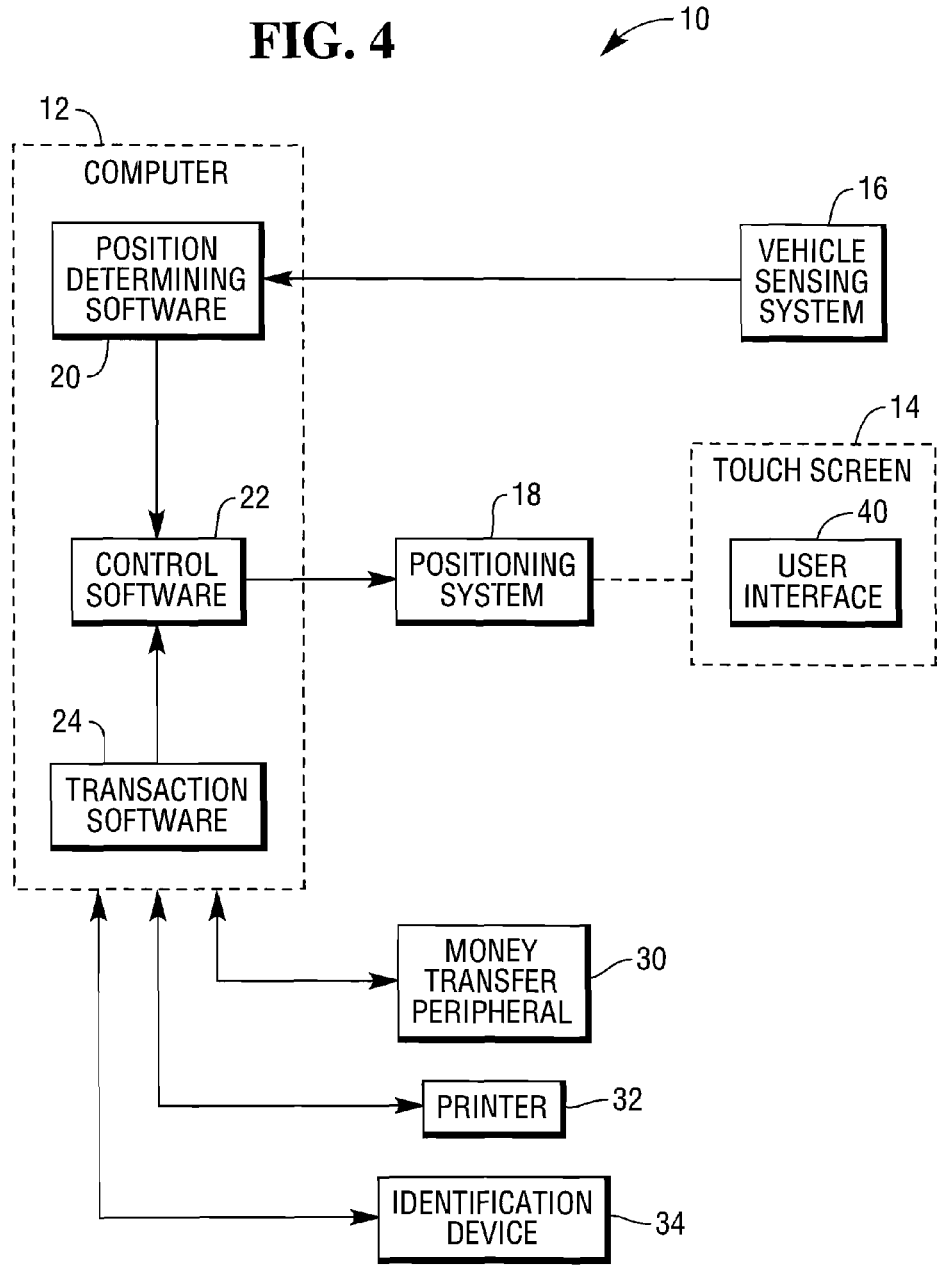
FIG. 4 illustrates a block diagram of a second example self-service system.

Referring now to FIG. 4, a second example embodiment is illustrated. In the second example embodiment, control software 22 controls positioning system 18 to physically move touch screen 14 and user interface 40.

Control software 22 may automatically activate positioning system 18 based upon position information captured by sensing system 16, or activate positioning system 18 under customer/operator control though user interface 40, or a combination of both.

In an automatic mode, position determining software 20 determines a location of one or more predetermined reference points of a vehicle adjacent to vehicle sensing system 16 as in the first embodiment. Control software 22 controls positioning of touch screen 14, including user interface 40 based upon vehicle position information captured by sensing system 16. Specifically, control software 22 activates positioning system 18 to physically move touch screen 14 to an optimal location based upon the reference point determined by position determining software 20.

Positioning system 18 may be capable of moving touch screen 14 in any combination of vertical and horizontal directions: left, right, up, down, and a direction towards away from a customer. For example, positioning system 18 may include common electromechanical and/or hydraulic components, such as a number of motors for positioning touch screen 14 in horizontal and vertical directions and for extending and retracting touch screen 14.

When a vehicle is not in front of order board 50, control software 22 may position touch screen 14 in a fully retracted position in order board 50. In order to avoid contacting a vehicle, vehicle sensing system 16 may include additional sensors for preventing activation of positioning system 18 while a vehicle is not present in front of order board 50, and for providing distance or proximity information between touch screen 14 and the vehicle when positioning system 18 is being activated. Control software 22 may stop activation when touch screen 14 reaches a predetermined distance from a vehicle. Control software 22 may also cause positioning system 18 to retract touch screen 14 to a fully retracted position before the customer drives forward, for example, following a final customer selection, such as striking a "Finished" button, in user interface 40, or an automatic event, such as printing of a receipt. System 10 may further include instructional lighting to indicate to the car's driver when to stop and when to pull forward.

Figure 5:
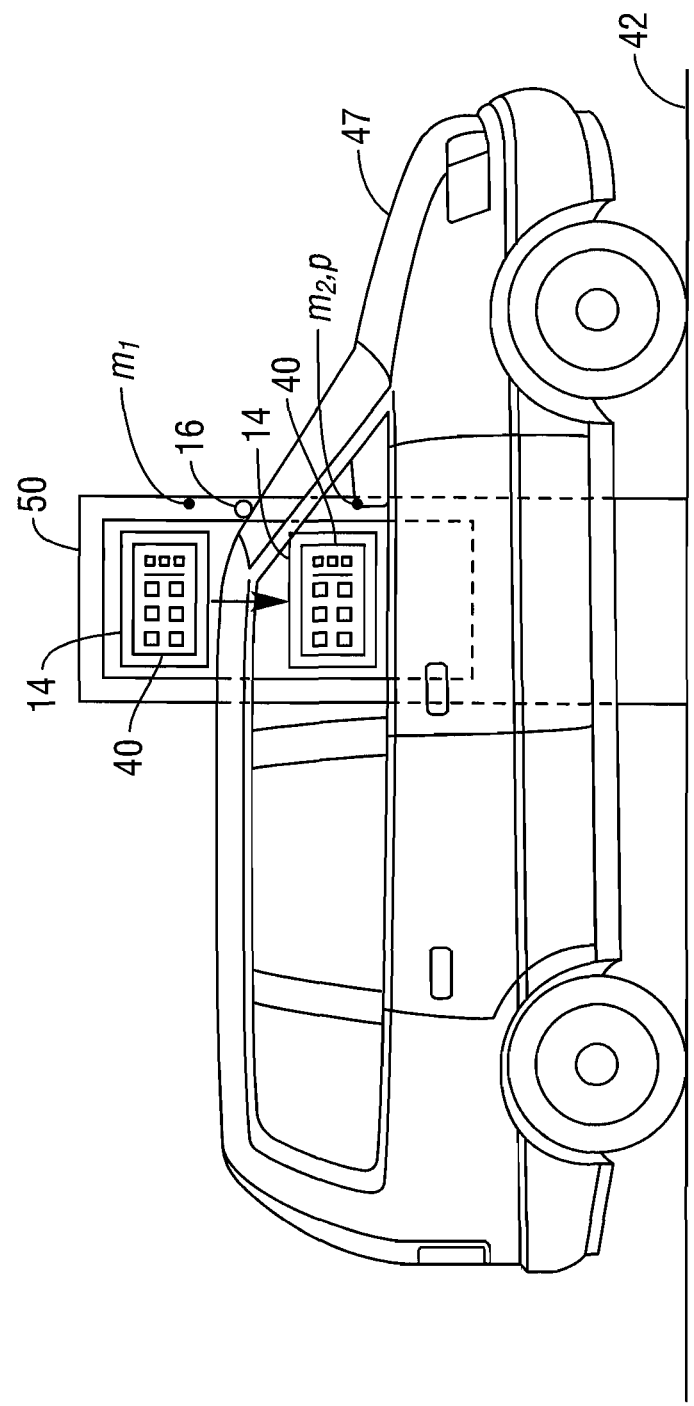
FIG. 5 illustrates example operating positions of a user interface according to the second example self-service system.

With reference to FIG. 5, touch screen 14 is located at a first position corresponding to a first possible movement point $m_1$ of positioning system 18. Position determining software 20 receives a captured image of a van 47 from vehicle sensing system 16 and identifies reference point p in the image that corresponds to the driver-side mirror. Control software 22 obtains a corresponding second movement point $m_2$ from a mapping of possible movements of positioning system 18 to captured image points and positions touch screen 14 at an optimal position relative to movement point $m_2$, as shown in FIG. 6. Control software 22 may maintain touch screen 14 in a fully retracted position during movement. Control software 22 may position touch screen 14 at movement point $m_2$, or at a predetermined horizontal and/or vertical distance from movement point $m_2$ as shown. Control software 22 may then extend touch screen 14 to a predetermined optimal distance from van 47.

Positioning system 18 may also physically move any peripherals necessary for the purpose of system 10.

Elements of the first example embodiment may be combined with the second example embodiment. For example, software positioning of user interface 40 may be combined with physical positioning of touch screen 14 to provide more flexibility in positioning user interface 40.

Although particular reference has been made to certain embodiments, variations and modifications are also envisioned within the spirit and scope of the following claims.

What is claimed is:

1. A self-service system for drive-through venues comprising:
   a stationary touch screen for displaying transaction information and recording operator selections in a user interface, the dimensions of the touch screen sufficient to display the user interface in one of a range of locations on the touch screen;
   a vehicle sensing system including an imaging device that captures at least one image of a vehicle adjacent to the self-service system;
   position determining software, executable by at least one processor of a computer of the self-service system, that receives information from the vehicle sensing system, the information including the at least one image of the vehicle adjacent to the self-service system, and analyzes the received information to map at least one location point represented in the received information;
   position adjustment software, executable by the at least one processor of the computer of the self-service system, to receive data representative of the mapped at least one location point from the position determining software to position the user interface within the touch screen based on the mapped at least one location point at a height above ground which substantially coincides with a window height above the ground of a vehicle adjacent the user interface; and
   at least one additional peripheral device co-located with the touch screen, the at least one additional peripheral device capable of performing at least one of receiving payment data and outputting a receipt;
   wherein:
      the height of the user interface is within a predetermined range of possible heights of the user interface corresponding to different window heights of different vehicles;
      the position adjustment software positions the user interface in a portion of the touch screen less than all the touch screen and sizes the user interface based on information received from the positioning determining software corresponding to a window height of the vehicle adjacent to the self-service system;
      the width of the user interface adjusted within a predetermined range of widths of the user interface corresponding to different window widths of different vehicles to display transaction screens with greater or less size and increase or decrease the size of corresponding touch areas including increasing or decreasing a number of touchpoints;
      information presentation software to fill at least a portion of other areas of the touch screen with content that are not filled with the user interface; and
      the position adjustment software further presents manual adjustment inputs and receive input therefrom to move the user interface.

2. The system of claim 1, further comprising wherein advertising is displayed in areas of the touch screen not used to display the user interface.

3. The system of claim 1, wherein:
   the vehicle sensing system senses at least one of distance between the vehicle adjacent to the self-service system and the self-service system; and
   the position determining software receives information about the location and distance of the vehicle from the vehicle sensing system wherein the distance information is used to resize the user interface including a resizing of corresponding touch areas.

4. The system of claim 3, further comprising:
   an indicator;
   wherein the position determining software manipulates the indicator to indicate to a driver of the vehicle when the vehicle is in a predetermined optimal position for using the user interface.

5. The system of claim 1, wherein the position adjustment software positions the user interface within the touch screen under customer position adjustment control.

6. The system of claim 1, wherein the position adjustment software positions the user interface within the touch screen automatically.

7. The system of claim 1, wherein the mapped at least one location point is on a driver-side mirror.

8. The system of claim 1, wherein the mapped at least one location point is on a driver-side window.

9. A self-service drive-through method comprising:
   receiving, in a self-service system from a vehicle sensing system communicatively coupled to the self-service system, position data, including a least one image, of a vehicle adjacent to the self-service system;
   receiving information, including information from the vehicle sensing system, directed to positioning a user interface within a touch screen display including screens displayed by the touch screen display and corresponding active touch points of the touch screen display by the self-service system, the dimensions of the touch screen display sufficient to provide a range of positions for locating the user interface and analyzing the received information to map at least one location point represented in the received information; and
   positioning the user interface within the touch screen display at a height above ground which substantially coincides with a window height above the ground of the vehicle adjacent the user interface by the self-service computer based on a position within the touch screen display relative to the mapped at least one location point;
   adjusting the width of the user interface within a predetermined range of widths of the user interface corresponding to different window widths of different vehicles to display transaction screens with greater or less size and increase or decrease the size of corresponding touch areas including increasing or decreasing a number of touchpoints;
   filling at least a portion of other areas of the touch screen with content that are not filled with the user interface;
   performing at least one of receiving payment data and outputting a receipt via at least one additional peripheral device co-located with the touch screen display;
   presenting manual adjustment inputs within the user interface, receiving input therefrom, and moving the user interface in response thereto; and
   wherein the height of the positioned user interface is within a predetermined range of possible heights of the user interface within the touch screen display corresponding to different window heights of different vehicles.

10. The method of claim 9, wherein the receiving step comprises:
receiving an input from the customer directed to positioning the user interface within the touch screen display.

11. The method of claim 9, wherein the positioning step comprises:
positioning the user interface in a portion of the touch screen display less than the entire touch screen display by the computer;
wherein the touch screen display has a height dimension sufficient for the computer to position the user interface in different portions of the touch screen display corresponding to the different window heights of the different vehicles.

12. The method of claim 9, further comprising positioning an advertisement in an area of the touch screen display not used to display the user interface.

13. A self-service apparatus comprising:
a touch screen configured to provide for display of a user interface; and
a processor configured to:
determine a location of a reference point on a vehicle positioned laterally from the touch screen by using a camera;
determine a position on the touch screen corresponding to the location of the reference point on the vehicle;
reposition the user interface from a first location on the touch screen to a second location on the touch screen; wherein the second location on the touch screen is a predetermined distance from the position on the touch screen corresponding to the location of the reference point on the vehicle;
adjust the width of the user interface within a predetermined range of widths of the user interface corresponding to different window widths of different vehicles to display transaction screens with greater or less size and increase or decrease the size of corresponding touch areas including increasing or decreasing a number of touchpoints; and
present manual adjustment inputs within the user interface, receiving input therefrom, and moving the user interface in response thereto;
at least one additional peripheral device co-located with the touch screen, the at least one additional peripheral device capable of performing at least one of receiving payment data and outputting a receipt; and
information presentation software to fill at least a portion of other areas of the touch screen with content that are not filled with the user interface.

* * * * *